Patented Jan. 3, 1933

1,893,109

UNITED STATES PATENT OFFICE

KENNETH M. SIMPSON, OF NEW YORK, N. Y.

METHOD OF PRODUCING FERROCHROME

No Drawing.   Application filed October 9, 1929.  Serial No. 398,579.

This invention relates to a method of producing ferro-chrome, having a low carbon content, and more particularly to the production of this material from the oxides.

Chromium has heretofore been produced by smelting chromite ($FeCr_2O_4$) in an electric furnace of the Heroult type, at exceedingly high temperatures, producing commercial ferro-chrome ($FeCr_2$) containing from 4% to 8% carbon. This process is quite expensive as it involves the electric fusion of the ingredients requiring the expenditure of a large amount of electrical energy. Furthermore, the ferro-chrome produced has a high carbon content, undesirable for many industrial uses of the product.

It is an object of my invention to provide a method for producing ferro-chrome without employing the electric furnace.

It is also an object of my invention to produce ferro-chrome without necessitating a fusion of the chromite ore.

It is a further object of my invention to produce a ferro-chrome having a very low carbon content.

A further object of my invention is to obtain a uniform reduction, eliminating the possibility of the reduction occurring in spots with the consequent production of a ferro-chrome of a non-homogenous consistency.

It is desirable so to adjust the amount of reducing material with relation to the ore being treated, and so to regulate the other conditions of the process, as to insure that just sufficient carbon will be absorbed in the ferro-chrome obtained from the reduction step to remove the last traces of oxide in the purification step. It is therefore another object of the present invention to produce a ferro-chrome substantially free from oxide, and simultaneously to effect substantial reduction of the carbon content by the removal of the oxide.

According to the present invention, the chromite ore is mixed with carbon in the proportions of two to three parts of ore to one part of carbon. The carbon may be in the form of anthracite coal, if desired. It has been found that, by using this large proportion of carbon to ore, the reduction is uniform throughout the mass. A much smaller proportion of carbon would effect a reduction in spots with the production of a non-homogeneous mass of ferro-chrome.

The mixture of ore and coal is then crushed to a fineness such as will pass through a 40 to 100 mesh screen. The mixed and crushed material is then placed in a container of refractory material and placed preferably in a tunnel kiln of the type used for the burning of various kinds of sanitary ware and bricks.

The mass is then subjected to a temperature high enough to bring about the reduction of the oxide at the highest reaction rate, but considerably below the softening point of the mass. Maintaining the mass in a non-fused state effects a great saving of fuel and insures economy of operation. In addition, by maintaining the mass in a non-fused state, it is easy to keep down the amount of absorbed carbon to a desired minimum. However, in the present process, though the mass is in a non-fused state, the ferro-chrome produced absorbs an appreciable amount of carbon. The heating step may be regulated in such a way that the proportion of absorbed carbon with respect to the oxygen remaining in the last traces of unreduced chromite is sufficient to effect complete removal of the oxygen, together with an elimination of practically all of the absorbed carbon, in the final purification step. The reduction is preferably carried to the point where the absorbed carbon is in equimolecular proportions to or slightly in excess over equimolecular proportions with respect to the oxygen in the unreduced chromite.

The temperature to which the mass is subjected in the reduction step may range from 1200° C. to 1450° C., but is preferably maintained at 1400° C. The heat treatment extends over a considerable period of time since the reaction takes place relatively slowly. One to three hours has been found to be sufficient to effect the desired degree of reduction, the actual time depending on the degree of fineness of the material and on the thickness of the layers of material undergoing treatment.

The reaction taking place may be represented by the following equation:

$$FeCr_2O_4 + 4C = FeCr_2 + 4CO.$$

By the reduction step, the particles of chromite are reduced to metallic particles of the same size and shape as the original oxide particles, but are porous due to removal of oxygen.

After the heat treatment, the particles of ferro-chrome with residual particles of gangue and carbonaceous matter are subjected to separation, to remove the earthy impurities and carbonaceous matter from the metallic particles. The carbonaceous matter is preferably removed by firing the coal in the mass at 600–650° C. This temperature is low enough to burn the carbon without affecting the metallic particles. The gangue or earthy material may be removed by conventional methods.

The residue obtained from the separation step comprises spongy metallic particles of ferro-chrome which, under the conditions of the process, still retain a considerable amount of oxygen in the form of unreduced $FeCr_2O_4$. Furthermore, the ferro-chrome absorbs a considerable quantity of carbon in the reduction process, as described, probably in the form of iron and chromium carbides. The carbon and oxygen are highly reactive due to the spongy nature of the particles of ferro-chrome.

The material is now charged into a suitable furnace and melted, together with suitable slags to remove extraneous impurities, at a temperature of 1550–1600° C., at which temperature the carbon and oxygen unite and escape in the form of CO gas. The product contains 1% or less carbon and is substantially free from oxygen.

Having thus described the invention, what I claim is:

1. A method of producing ferro-chrome which consists in mixing finely divided chromite ore and carbon, heating the mixture without fusion until reduction has been substantially completed, heating the mass at a temperature sufficiently high to burn off the non-absorbed carbonaceous material, but sufficiently low so as not to affect the metallic particles, eliminating extraneous earthy material, melting the metallic residue, and maintaining the same in a molten condition, until substantially all the residual oxygen and carbon escape in the form of gas.

2. A method of producing ferro-chrome which comprises obtaining an intimate mixture of chromite ore with an excess of carbonaceous material, the said excess being proportioned to effect uniform reduction through the mass, and to permit the absorption of carbon in a predetermined amount during the reduction step, heating the mixture to a conversion temperature which is below the fusing point of the mass but which is sufficiently elevated to permit absorption of said predetermined amount of carbon by the reduced metal, maintaining the mass substantially at such temperature until the reduction is complete except for comparatively small amounts of unreduced ore, controlling reduction conditions so that the amount of absorbed carbon is at least sufficient to remove the oxygen of the unreduced ore during subsequent treatment, fusing the material so produced to remove the last traces of oxygen from the unreduced ore by reduction with the absorbed carbon.

In testimony whereof I affix my signature.

KENNETH M. SIMPSON.